(12) United States Patent
Heng et al.

(10) Patent No.: US 9,540,253 B2
(45) Date of Patent: Jan. 10, 2017

(54) WATER TREATMENT IN AT LEAST ONE MEMBRANE FILTRATION UNIT FOR ASSISTED RECOVERY OF HYDROCARBONS

(75) Inventors: Samuel Heng, Billere (FR); Pierre Pedenaud, Lescar (FR)

(73) Assignee: TOTAL S.A., Courbevoie (FR)

( * ) Notice: Subject to any disclaimer, the term of this patent is extended or adjusted under 35 U.S.C. 154(b) by 324 days.

(21) Appl. No.: 13/878,927

(22) PCT Filed: Oct. 11, 2011

(86) PCT No.: PCT/IB2011/054469
§ 371 (c)(1),
(2), (4) Date: Apr. 11, 2013

(87) PCT Pub. No.: WO2012/049618
PCT Pub. Date: Apr. 19, 2012

(65) Prior Publication Data
US 2013/0192836 A1  Aug. 1, 2013

(30) Foreign Application Priority Data
Oct. 14, 2010 (FR) ...................... 10 58370

(51) Int. Cl.
C02F 1/44 (2006.01)
E21B 43/00 (2006.01)
(Continued)

(52) U.S. Cl.
CPC . C02F 1/44 (2013.01); C02F 9/00 (2013.01); E21B 43/00 (2013.01); C02F 1/38 (2013.01); C02F 1/40 (2013.01); C02F 1/444 (2013.01); C02F 2101/32 (2013.01); C02F 2103/365 (2013.01); C02F 2201/008 (2013.01)

(58) Field of Classification Search
CPC .............. E21B 43/00; C02F 1/44; C02F 1/001
See application file for complete search history.

(56) References Cited

U.S. PATENT DOCUMENTS 4,000,065 A * 12/1976 Ladha .................... C02F 1/444
                                                      210/195.2
4,176,057 A * 11/1979 Wheatley ............. B01D 61/025
                                                      210/137

(Continued)

FOREIGN PATENT DOCUMENTS

FR       0959254 A    12/2009
WO    WO-9000922 A1   2/1990
(Continued)

Primary Examiner — Zakiya W Bates
Assistant Examiner — Crystal J Miller
(74) Attorney, Agent, or Firm — Harness, Dickey & Pierce, P.L.C.

(57) ABSTRACT

A water treatment method is provided. The method includes filtering water in a membrane filtration unit including at least one membrane filtration module, collecting a permeate and collecting a retentate at the outlet of the membrane filtration module, withdrawing solid materials and/or hydrocarbons contained in the retentate, in order to provide a treated retentate, recycling the treated retentate at the inlet of the membrane filtration module, and providing a treated water flow from the permeate from membrane filtration module(s). An installation adapted for applying this method is also provided.

19 Claims, 2 Drawing Sheets

(51) Int. Cl.
*C02F 9/00* (2006.01)
*C02F 1/38* (2006.01)
*C02F 1/40* (2006.01)
*C02F 101/32* (2006.01)
*C02F 103/36* (2006.01)

(56) References Cited

U.S. PATENT DOCUMENTS

| | | | |
|---|---|---|---|
| 4,663,932 A | 5/1987 | Cox | |
| 4,748,288 A * | 5/1988 | Bitter | B01D 61/022 208/308 |
| 4,872,991 A * | 10/1989 | Bartels | B01D 17/0208 210/651 |
| 4,876,013 A | 10/1989 | Shmidt et al. | |
| 4,915,844 A * | 4/1990 | Imamura | B01D 61/025 210/259 |
| 5,158,681 A * | 10/1992 | Freeman | B01D 17/085 210/259 |
| 5,227,071 A * | 7/1993 | Torline | B01D 17/02 210/195.2 |
| 5,501,798 A * | 3/1996 | Al-Samadi | B01D 61/04 210/638 |
| 5,635,071 A * | 6/1997 | Al-Samadi | B01D 61/022 210/641 |
| 5,662,050 A * | 9/1997 | Angelo, II | B01D 53/74 110/246 |
| 5,853,593 A * | 12/1998 | Miller | B01D 17/085 210/641 |
| 5,932,091 A * | 8/1999 | Tompkins | B01D 17/0211 210/137 |
| 5,947,421 A | 9/1999 | Beattie et al. | |
| 6,190,556 B1 * | 2/2001 | Uhlinger | B01D 61/022 210/134 |
| 6,193,194 B1 | 2/2001 | Minovitch | |
| 6,210,575 B1 | 4/2001 | Chase et al. | |
| 6,245,121 B1 * | 6/2001 | Lamy | B01D 61/04 210/600 |
| 6,254,779 B1 * | 7/2001 | Jeffery | B01D 61/04 210/195.2 |
| 6,355,175 B1 * | 3/2002 | Green | B01D 61/022 210/639 |
| 6,383,369 B2 * | 5/2002 | Elston | C02F 9/00 210/104 |
| 6,461,514 B1 * | 10/2002 | Al-Samadi | B01D 61/022 210/638 |
| 6,485,649 B1 * | 11/2002 | Terava | C02F 1/02 210/108 |
| 6,843,917 B1 * | 1/2005 | Guy | B01D 61/04 210/638 |
| 7,018,539 B2 * | 3/2006 | Mairal | B01D 17/02 210/259 |
| 7,378,024 B2 * | 5/2008 | Bartels | B01D 63/02 210/321.69 |
| 7,396,453 B1 * | 7/2008 | Probst | C02F 1/44 210/150 |
| 7,569,671 B2 | 8/2009 | Cheryan | |
| 7,648,634 B2 * | 1/2010 | Probst | C02F 1/44 210/620 |
| 7,789,159 B1 * | 9/2010 | Bader | B01D 61/04 166/279 |
| 8,101,083 B2 * | 1/2012 | Ruehr | B01D 61/025 210/202 |
| 8,469,092 B2 * | 6/2013 | Curole | B01D 61/027 166/266 |
| 8,758,614 B2 * | 6/2014 | Ewing | B01D 61/22 210/603 |
| 2002/0189807 A1 | 12/2002 | Emanuele et al. | |
| 2004/0079706 A1 * | 4/2004 | Mairal | B01D 17/02 210/651 |
| 2005/0016922 A1 * | 1/2005 | Enzweiler | B01D 61/022 210/639 |
| 2006/0041216 A1 | 2/2006 | McLaughlin et al. | |
| 2006/0065598 A1 * | 3/2006 | Comstock | B01D 65/02 210/639 |
| 2006/0213165 A1 * | 9/2006 | Isomura | B01D 63/061 55/523 |
| 2006/0219613 A1 * | 10/2006 | Scheu | B01D 61/022 210/108 |
| 2007/0102359 A1 * | 5/2007 | Lombardi | B01D 17/085 210/639 |
| 2007/0163958 A1 * | 7/2007 | Newcombe | C02F 1/004 210/650 |
| 2008/0217230 A1 * | 9/2008 | Salmon | B01D 61/025 210/170.11 |
| 2009/0014387 A1 * | 1/2009 | Probst | C02F 3/1268 210/650 |
| 2009/0050572 A1 | 2/2009 | McGuire et al. | |
| 2009/0056940 A1 | 3/2009 | Minnich et al. | |
| 2010/0193436 A1 * | 8/2010 | Ruehr | B01D 61/025 210/636 |
| 2011/0005749 A1 * | 1/2011 | Curole | B01D 61/027 166/272.3 |
| 2011/0253624 A1 * | 10/2011 | Ewing | B01D 61/22 210/607 |
| 2012/0248035 A1 | 10/2012 | Coffin et al. | |
| 2013/0075328 A1 * | 3/2013 | Ewing | B01D 61/22 210/607 |
| 2013/0213649 A1 * | 8/2013 | Heng | E21B 43/34 166/267 |
| 2013/0284677 A1 * | 10/2013 | Snydmiller | C02F 9/00 210/703 |
| 2013/0313191 A1 * | 11/2013 | Wolf | C02F 9/00 210/638 |
| 2014/0021115 A1 * | 1/2014 | Ellegaard | C02F 9/005 210/182 |

FOREIGN PATENT DOCUMENTS

| | | |
|---|---|---|
| WO | WO 2007138327 A1 * | 12/2007 |
| WO | WO-2007138327 A1 | 12/2007 |
| WO | WO-2009012378 A1 | 1/2009 |
| WO | WO-2012024099 A1 | 2/2012 |

* cited by examiner

WATER TREATMENT IN AT LEAST ONE MEMBRANE FILTRATION UNIT FOR ASSISTED RECOVERY OF HYDROCARBONS

CROSS-REFERENCE TO RELATED APPLICATIONS

This application is a National Phase Entry of International Application No. PCT/IB2011/054469, filed on Oct. 11, 2011, which claims priority to French Patent Application No. 1058370, filed on Oct. 14, 2010, both of which are incorporated by reference herein.

FIELD OF THE INVENTION

The present invention relates to a method for treating water within the scope of the production of hydrocarbons, and more particularly of enhanced oil recovery, as well as to an installation suitable for applying this method.

BACKGROUND

In the field of the production of hydrocarbons, after the operations for recovering hydrocarbons by means of the natural pressure of the underground formation containing the hydrocarbons, a so-called "primary" recovery, it is generally proceeded with so-called "secondary" recovery by injection of water. Within this context, it is generally necessary to treat water before its injection into the underground formation, in order get rid of the major portion of contaminants which it may contain, notably solid materials and drops of hydrocarbons. To do this, it is known how to resort to membrane filtration of water. Membrane filtration may be frontal or tangential. Tangential filtration has lesser risks of clogging the filters and therefore has a significantly longer lifetime (or requires less strict or less frequent maintenance).

Within the scope of tangential filtration, the retentate from the membrane filters is recycled towards said membrane filters. Carrying out a preliminary treatment of the water to be treated by means of a cyclonic separator, of a flotation unit or other unit, is known before feeding the membrane filters, in order to reduce the risks of clogging of the filters. However, membrane filtration devices presently used still have risks of clogging the membrane filters, which is particularly undesirable within the context of offshore hydrocarbon production, or even in Ran an undersea medium, where it is desired to limit as much as possible operations for maintenance or replacement of membrane filters. Therefore there exists a need of developing a method for treating water within the scope of enhanced oil recovery which allows a reduction in the risks of clogging of membrane filters.

SUMMARY

The invention first relates to a method for treating water, comprising:
  filtering water in a membrane filtration unit comprising at least one membrane filtration module;
  collecting a permeate and collecting a retentate at the outlet of the membrane filtration module;
  withdrawing solid materials and/or hydrocarbons contained in the retentate, in order to provide a treated retentate;
  recycling the treated retentate at the inlet of the membrane filtration module;
  providing a treated water flow from the permeate of the membrane filtration module(s).

According to an embodiment, the water feeding the membrane filtration unit is water withdrawn from the environment and/or production water stemming from a production flow extracted in an underground formation containing hydrocarbons.

According to an embodiment, the method comprises:
  pretreating the production water prior to filtration of the latter, said pretreatment preferably comprising one or more steps selected from gas/liquid separation, liquid/solid separation and water/hydrocarbons separation; and/or
  pretreating the withdrawn water prior to the filtration of the latter, said pretreatment preferably comprising one or more steps selected from preliminary filtration, deoxygenation, chlorination, desulfatation, biocidal treatment and an injection of anti-deposition or anti-corrosion compounds.

According to an embodiment, the method further comprises the purification of the water flow treated in an additional membrane filtration unit, and collecting a treated and purified water flow from the additional membrane filtration unit. According to an embodiment, the method is applied offshore on a floating support or at the sea bed. According to an embodiment, the treated, and if necessary purified, water flow is injected into an underground formation containing hydrocarbons, optionally after adding one or more additives.

The invention also relates to an installation for water treatment, comprising:
  A membrane filtration unit comprising:
    at least one membrane filtration module;
    a line for admission of water connected at the inlet of the membrane filtration module;
    a line for collecting permeate connected to the outlet of the membrane filtration module;
    means for collecting retentate connected at the outlet of the membrane filtration modules;
    liquid/solid separation means and/or water/hydrocarbon separation means fed by the retentate collecting means;
    a line for recycling treated retentate connected at the outlet of the liquid/solid separation means and/or water/hydrocarbons separation means and feeding the water admission line;
  a line for collecting treated water, from the membrane filtration unit.

According to an embodiment, the liquid/solid separation means and/or water/hydrocarbons separation means comprise a hydrocyclone.

According to an embodiment, the installation comprises:
  means for withdrawing water from the environment;
  a unit for extracting hydrocarbons contained in an underground formation;
  a line for admitting withdrawn water, from the water withdrawal means and feeding the membrane filtration unit; and
  a line for admitting production water fed by the hydrocarbon extraction unit and feeding the membrane filtration unit.

According to an embodiment, the installation comprises:
  a pretreatment unit located on the production water admission line and preferably comprising one or more separation systems selected from gas/liquid separation, liquid/solid separation and water/hydrocarbon separation systems; and/or a pretreatment unit located on the line for admitting withdrawn water, and preferably comprising one or more pieces of equipment selected from a preliminary filtration system, a deoxygenation system, a chlorination system, a desulfatation system, a biocidal treatment system and a system for injecting anti-deposition or anti-corrosion compounds.

According to an embodiment, the membrane filtration unit comprises a plurality of membrane filtration trains, each membrane filtration train comprising a feeding pump and one or more circuits which each comprise one or more membrane filtration modules; and preferably a distribution system fed by the line for admitting withdrawn water and the line for admitting production water and feeding the membrane filtration trains. According to an embodiment, the membrane filtration unit includes inorganic membrane filters, or organic membrane filters or hybrid membrane filters, preferably inorganic membrane filters are in ceramic based on $Al_2O_2$, $TiO_2$, $ZrO_2$, $SiO_2$, MgO, SiC or a mixture thereof and more preferably ceramic membrane filters based on SiC.

According to an embodiment, the installation comprises:
an additional membrane filtration unit, fed by the line for collecting treated water;
a line for collecting treated and purified water, connected at the outlet of the additional membrane filtration unit.

According to an embodiment, the installation is positioned on a support either floating on the sea or on the sea bed.

The invention also relates to a method for producing hydrocarbons comprising:
water treatment according to the method described above;
recovery of a hydrocarbon flow from the production flow.

With the present invention it is possible to overcome the drawbacks of the state of the art, more particularly it provides a method for treating water (and a corresponding installation) with which risks of clogging the membrane filters may be reduced. This is obtained by a treatment of the retentate before its recycling, according to which the retentate is at least cleared of a portion of the solid materials and/or the hydrocarbon drops which it contains. The separation of the solid materials and/or the hydrocarbon drops in the retentate is all the more efficient since the conditions are favorable for separation by separation means of the hydrocyclone type: indeed, the flow rate of the retentate is high and the concentration of solid materials and/or hydrocarbon drops in the retentate is also relatively high (in any case higher than in the flow feeding the membrane filtration unit).

Conversely, the filtration gains in efficiency since the concentration of contaminants in the flow feeding the filter is reduced. Therefore, there exists particularly efficient coupling and even synergy between the filtration membranes and the separation membranes which are associated with them.

According to certain particular embodiments, the invention also has one or preferably more of the advantageous features listed below.
The invention allows multipurpose treatment. By using a same piece of equipment, it is possible to either only treat water withdrawn from the environment (notably at the initial stage of the exploitation of the underground formation) or only treat production water (if the latter is collected in a sufficient amount after the initial stage for exploitation of the underground formation), or further simultaneously treat production water and water withdrawn from the environment (providing a contribution for injection). Therefore, the method of the invention is both efficient and simpler to be implemented than the methods used in the state of the art. In particular, the invention may be applied with a reduced number of pieces of equipment and with a better rate of use of the equipment.
With the invention, it is possible if necessary to add value to the hydrocarbons recovered from the retentate.
With the invention, if this is desired, it is possible to obtain very good quality of the injection water, not only allowing injection in a fractured mode, but also possibly in a matrix mode.
With the invention, it is possible to obtain a constant quality of water regardless of the changes in the feed, and notably changes in flow rate at the input. Also, the separation operated on the retentate is facilitated by the stability of the pressure and of the flow rate at the inlet. Energy savings are achieved on said separation since the pressure and the flow rate anyhow imposed by the membrane filtration are used.
Membrane filtration is simple to control. No gas is generated which is compatible with undersea use.

DETAILED DESCRIPTION

The invention is now described in more detail and in a non-limiting way in the following description.

Tangential Filtration Circuit According to the Invention

Figure 3:
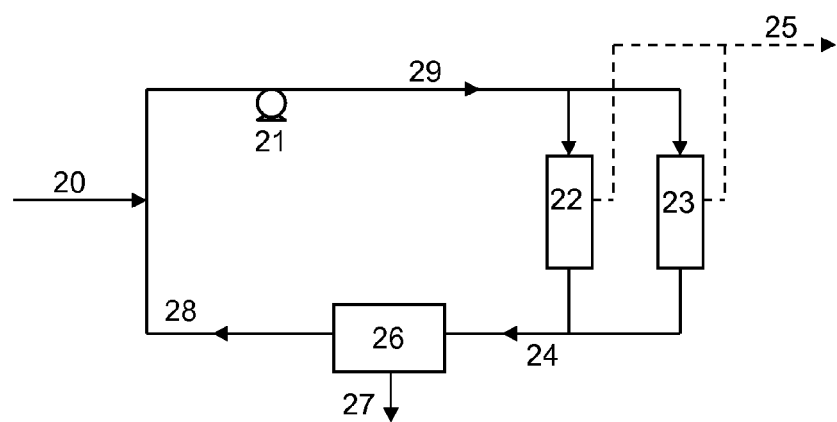
FIG. 3 schematically illustrates an embodiment of a circuit present in the membrane filtration unit used in the invention.

The coupling of the membrane filtration to purification of the retentate before recycling the latter, is first described with reference to FIG. 3, where a tangential membrane filtration circuit is illustrated within the membrane filtration unit which is used within the scope of the invention. The circuit comprises a water admission line 29, on which is positioned a circulation pump 21. The water admission line 29 opens out into one or more membrane filtration modules 22, 23 positioned in series and/or in parallel, and preferably in parallel. In the illustrated embodiment, two membrane filtration modules 22, 23 positioned in parallel are provided. By "membrane filtration module" is meant an individual membrane filtration element, comprising a membrane filter.

A line for collecting permeate 25 is connected at the outlet of the membrane filtration modules 22, 23. Also means for collecting retentate 24 are connected at the outlet of the membrane filtration modules 22, 23. In the illustrated case, this is a retentate collecting line.

The retentate collecting means 24 feed separation means 26 which may be liquid/solid separation means; or water/hydrocarbon separation means; or further liquid/solid separation means associated with water/hydrocarbons separation means. The separation means 26 may comprise gravity separation means of the decanter type or a separation means by flotation. But preferably these are desanding and/or deoiling hydrocyclone(s) since these devices are relatively compact. It is further possible to use a rotary hydrocyclone, such as the one described in application no. FR 09/59254 as of Dec. 18, 2009.

At least one line for collecting contaminants 27 is connected at the outlet of the separation means 26; it allows recovery of the withdrawn materials from the retentate (hydrocarbons and/or solid materials). A line for recycling the treated retentate 28 is also connected at the output of the separation means 26; it allows recovery of the majority of the retentate, cleared of part of its contaminants (hydrocarbons and/or solid materials). The line for recycling the treated retentate 28 feeds the water admission line 29. A water feeding line 20 also opens out into the water admission line 29.

As described above, such a tangential filtration circuit allows limitation in the amount of contaminants (hydrocarbons and/or solid materials) on the membrane filters, and therefore reduction in the risks of clogging and increase in the lifetime of the membrane filters. The power of the circulation pump 21 is adapted to so as to take into account the presence of the separation means 26.

According to another embodiment (not illustrated), provision may be made for a separator (notably a hydrocyclone) directly coupled at the outlet of each membrane filtration module 22, 23. In this case, the retentate collecting means 24 are simply connection means between the membrane filtration nozzles 22, 23 and the respective separators, this ensures optimum compact integration of the different pieces of equipment.

Use of the Tangential Filtration Circuit According to the Invention

Figure 1:
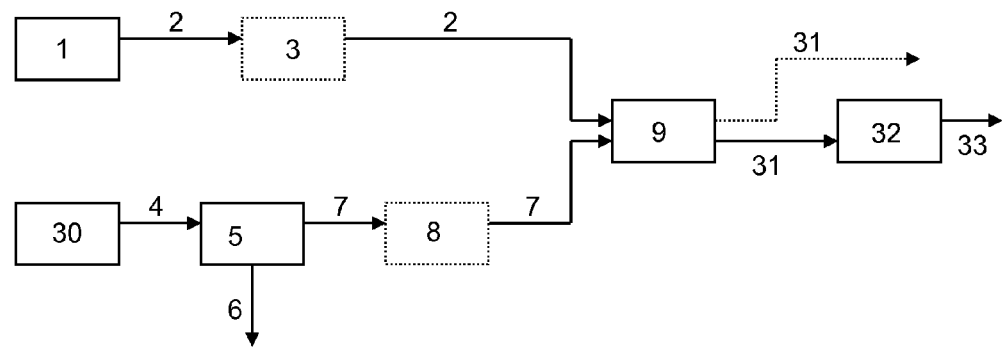
FIG. 1 schematically illustrates an embodiment of the installation according to the invention.

The installation according to the invention may for example comprise a single membrane filtration unit;
which is fed with a flow of water withdrawn from the environment: or
which is fed by a flow of production water; or
which, with reference to FIG. 1, is a membrane filtration unit 9 fed or capable of being fed with two distinct flows of water, i.e. water withdrawn from the environment and production water, and this by means of a line for admitting withdrawn water 2 and a line for admitting production water 7; correlatively, the water admission line 20 described above in connection with FIG. 3 is fed by a line for admitting withdrawn water 2 and/or a line for admitting production water 7.

It is this third possibility, in accordance with FIG. 1, which is most particularly described in the following, it being understood that the invention may be applied mutatis mutandis with a single supply of water withdrawn from the environment and with a single supply of production water. Production water designates water which stems from a production flow, i.e. a flow from an underground formation containing hydrocarbons. More specifically, a hydrocarbon extraction unit 30, comprising one or more extraction wells located in the underground formation, provides a production flow in a production flow admission line 4.

The production flow is a mixture of hydrocarbons, water and possibly solid particles and/or gas. This production flow is separated into several fractions in a separation unit 5 fed by the production flow admission line 4. In particular, at least one hydrocarbon fraction is recovered in a hydrocarbon collecting line 6, and an aqueous fraction (production water) is drawn off in the production water admission line 7.

The production water may undergo a preliminary treatment before filtration in the membrane filtration unit 9, if this is necessary, taking into account the nature and the quality of the production water, and taking into account the desired specifications for the treated water. In this case, provision is made for a pre-treatment unit 8 on the production water admission line 7. This pre-treatment unit 8 may for example comprise one or more separation systems selected from gas/liquid separation, liquid/solid separation and water/hydrocarbons separation systems, which may notably comprise one or more hydrocyclones, or one or more gravity separation apparatuses.

The pre-treatment unit 8, when it is present, continues and refines the separation between water, hydrocarbons, solids and gases from the production flow which has been started in the separation unit 5. According to an embodiment, no pre-treatment of the production water is provided, on the contrary, the treatment of the production water being directly carried out in the membrane filtration unit 9 for more simplicity.

The water withdrawn from the environment is obtained by withdrawal means 1. The term of "environment" designates not only the natural environment (water may for example be withdrawn from water streams or surface water expanses notably rivers, lakes and the sea, or further may be withdrawn from an underground water-bearing formation), but also non-natural sources of water, such as industrial or domestic effluents (waste water, sewage water and other waters). Generally the withdrawn water may stem from any source of water except for the underground formation containing the hydrocarbons. In other words it is distinct from the production water. According to an embodiment, the invention is applied at sea, and water is withdrawn from the sea.

The withdrawal means 1 may comprise extraction and pumping means. The withdrawn water may undergo a preliminary treatment before filtration in the membrane filtration unit 9, if this is necessary, taking into account the nature and the quality of the withdrawn water, and taking into account the desired specifications for the treated water. In this case, a pre-treatment unit 3 is provided on the withdrawn water admission line 2. This pre-treatment unit 3 may for example comprise a preliminary filtration system; and/or a deoxygenation system; and/or a chlorination system; and/or a desulfatation system; and/or a biocidal treatment system; and/or a system for injecting anti-deposition/anti-corrosion compounds.

Thus, the withdrawn water is pre-treated, and notably depending on the cases, filtered beforehand; and/or deoxygenated; and/or chlorinated; and/or desulfated; and/or treated with a biocidal agent; and/or is added with anti-deposition/anti-corrosion compounds. The relevant preliminary filtration is coarse filtration by means of one or more filters having a pore size greater than 5 μm and generally greater than 10 μm, greater than 100 μm or even greater than 1 mm.

According to an embodiment, no pre-treatment of the production water is provided, on the contrary, the treatment of the production water being directly carried out in the membrane filtration unit 9 for more simplicity. The production water and/or the withdrawn water are treated in the membrane filtration unit 9. The treated water is recovered in at least one line for collecting treated water 31, connected at the outlet of the membrane filtration unit 9. In other words, the treated water collecting line 31 is fed by lines for collecting permeate 25 such as those described above in connection with FIG. 3, at the outlet of various circuits comprising membrane filtration modules 22, 23. The treated water recovered in the treated water collecting line 31 is preferably used in order to be injected into the underground formation, in one or more injection wells. It is possible to add additive(s) to the treated water (for example surfactants or polymers intended to increase the viscosity of the water), in order to increase the efficiency of the sweeping of the underground formation with the injected water.

Figure 2:
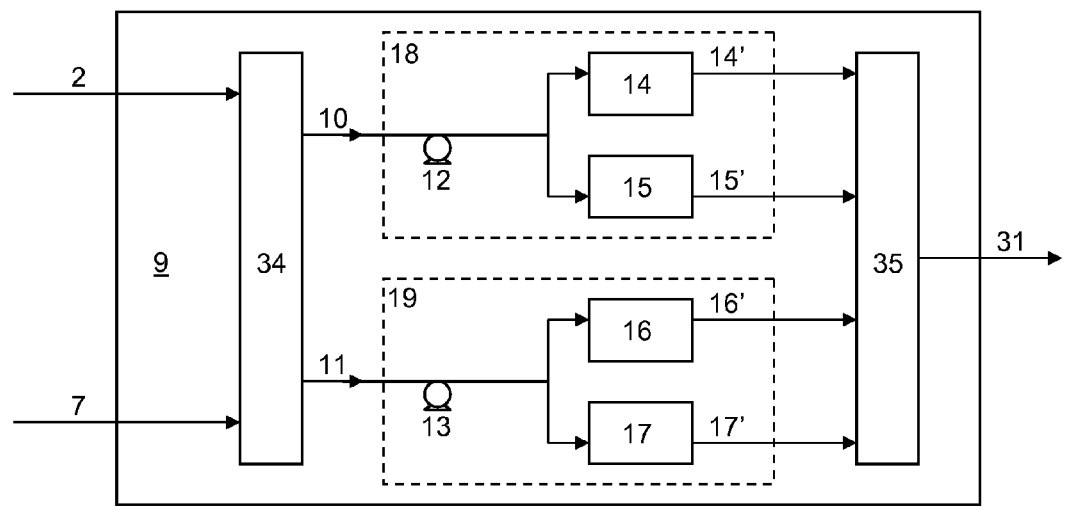
FIG. 2 schematically illustrates an embodiment of the membrane filtration unit used in the invention.

According to an embodiment, and with reference to FIG. 2 the membrane filtration unit 9 comprises at least one, and generally several membrane filtration trains 18, 19. Each membrane filtration train 18, 19 is fed with a respective train feeding line 10, 11, provided with a respective feed pumping system 12, 13. Each membrane filtration train 18, 19 comprises at least one, and generally several circuits 14, 15, 16, 17 which are as described above in connection with FIG. 3. In the illustrated example, a first membrane filtration train 18 comprises two circuits 14, 15 which are both fed with a same train feeding line 10. Also, a second membrane filtration train 19 comprises two circuits 16, 17 which are both fed with a same train feeding line 11. Individual lines for collecting treated water 14', 15', 16', 17' are connected at the outlet of the respective circuits 14, 15, 16, 17 and correspond to lines for collecting permeate 25 as described above.

The membrane filtration unit 9 therefore has a modular structure and may operate in a multipurpose way both at the input and at the output. As regards the inlet, the membrane filtration unit 9 advantageously comprises a distribution system 34 to which are connected: at the input, the withdrawn water admission line 2, and the production water admission line 7; and at the output, the train feeding lines 10, 11. The distribution system 34 is adapted so as to separately feed each train feeding line 10, 11 either with withdrawn water, or with production water, or with a mixture of withdrawn water and of production water as selected by the operator. As regards the output, the membrane filtration unit 9 advantageously comprises a distribution system 35 to which are connected: at the inlet, individual lines for collecting treated water 14', 15', 16', 17'; and at the output line(s) for collecting treated water 31.

At the beginning of the exploitation of the underground formation, there is no available production water, and withdrawn water is only treated in the membrane filtration unit 9. Subsequently, when production water is available, it is advantageous to use this production water for injection. In this case, the production water is only treated in the membrane filtration unit 9 (withdrawing water from the environment is then stopped); or else production water and withdrawn water (ensuring a contribution) are both treated in the membrane filtration unit 9, and this either in separate membrane filtration modules or in the same membrane filtration modules (the production water and the withdrawn water may be mixed together). Therefore, in the method of the invention, the filtration of the withdrawn water and the filtration of the production water in the membrane separation unit 9 may be carried out successively or simultaneously according to the exploitation periods.

In the case of excess production water according to the needs as regards injection (and notably in the case of a reduction or interruption or stopping of the injection) it is possible to discard all or part of the treated water into the environment instead of injecting it into the underground formation. The membrane filters present in the membrane filtration unit 9 may be organic membrane filters (in polymer) or inorganic membrane filters (in ceramic) or hybrid membrane filters, partly in ceramic and partly in polymer). The selection of the membrane filters is preferably carried out so that the latter may treat both the withdrawn water and production water, despite the different characteristics of these flows.

Preferably, the membrane filters have to tolerate the presence of hydrocarbon compounds and notably aromatic compounds such as toluene and benzene, which may be present in the production water. Preferably, the membrane filters have to be able to withstand a temperature greater than or equal to 40° C., notably greater than or equal to 50° C., notably greater than or equal to 60° C., notably greater than or equal to 70° C., notably greater than or equal to 80° C., or even greater than or equal to 90° C., since the production of water may attain or exceed such temperature thresholds.

For the whole of these reasons, it is preferable to use ceramic membrane filters (which may notably withstand a hydrocarbon content ranging up to one or even 3% as well as a high temperature), and notably membrane filters based on $Al_2O_3$, $TiO_2$, $ZrO_2$, $SiO_2$, MgO, SiC or a mixture thereof. The SiC-based membrane filters are particularly preferred because of their great hydrophilicity; they are easy to clean, withstand abrasion and may withstand high water flow rates. Certain organic membrane filters, notably those based on a material known as Teflon®, may also be suitable depending on the applications.

According to an embodiment, all the filtration trains, 18, 19 of the membrane filtration unit 9 are identical; and/or all the circuits 14, 15, 16, 17 of the filtration trains 18, 19 are identical; and/or all the membrane filtration modules 22, 23 and all the membrane filters are identical (except possibly in the case of filtration modules positioned in series). The membrane filtration unit 9 is preferably a microfiltration or ultrafiltration unit, i.e. the membrane filters which it contains, have a pore size from 0.01 to 10 μm, and preferably from 0.01 to 1 μm. Thus, the membrane filtration unit 9 is adapted for suppressing the hydrocarbon drops as well as solid materials in suspension in the water.

As an example, the water at the inlet of the membrane filtration unit 9 may contain up to 1,000 ppm of hydrocarbons and up to 200 mg/L of solid materials in suspension. The water treated at the outlet of the membrane filtration unit 9 may contain less than 10 ppm (preferably less than 5 ppm or even less than 1 ppm) of hydrocarbons and less than 10 mg/L (preferably less than 1 mg/L) of suspended solid materials: it is thus adapted to injection (including in a matrix mode) or to being discarded into the environment.

If it is desired to obtain an even higher water purity, and notably remove the dissolved salts, provision is made for an additional membrane filtration unit 32 fed by the line for collecting treated water 31. This additional membrane filtration 32 is preferably a reverse osmosis or nanofiltration unit (comprising membrane filters having a pore size of less than 0.01 μm). Treated and purified water is then recovered in a line for collecting treated and purified water 33 connected at the outlet of the additional membrane filtration unit 32.

Complementary treatment means may also be provided depending on the needs, for example a unit for deoxygenation of water between the membrane filtration unit 9 and the additional membrane filtration unit 32 (in this case, it is unnecessary to provide deoxygenation upstream from the membrane filtration unit 9). It may be advantageous to heat the water at the inlet of the membrane filtration unit 9, in order to reduce its viscosity and to reduce the risks of clogging of the membrane filters with the hydrocarbons. To do this, provision is made for a heat exchanger on the withdrawn water admission line 2 and/or on the production water admission line 7 and/or on the train feeding lines 10, 11. The heat exchanger may for example be coupled with the conduit(s) for collecting treated water 31 or else with the individual lines for collecting treated water 14', 15', 16', 17', in order to recover the calories of the treated water (which may typically be at a temperature from 30 to 80° C.).

The invention may be applied on land or at sea. The offshore application may be on a floating support or a platform, or further on the sea bed, while using suitable equipment (marinization of the equipment).

The invention claimed is:

1. A water treatment method, comprising the following successive steps:
   (i) filtering water in a membrane filtration unit comprising at least one membrane filtration module, the water containing hydrocarbons in an amount of up to 1000 ppm and suspended solid materials in an amount of up to 200 mg/L;
   (ii) collecting a permeate and collecting a retentate at an outlet of the membrane filtration module(s);
   (iii) withdrawing at least one of: (a) solid material and (b) hydrocarbons, contained in the retentate collected after step (ii) in order to provide a treated retentate;
   (iv) recycling the treated retentate at the inlet of the membrane filtration module(s); and
   (v) providing a treated water flow from the permeate of the membrane filtration module(s), the treated water flow comprising less than 10 ppm of hydrocarbons and less than 10 mg/L of suspended solid materials,
   wherein the membrane filtration unit includes inorganic membrane filters in ceramic based $Al_2O_3$, $TiO_2$, $ZrO_2$, $SiO_2$, MgO, SiC or a mixture thereof, having a pore size ranging from 0.01 to 10 µm.

2. The method according to claim 1, further comprising withdrawing the water feeding the membrane filtration unit from at least one of: (a) the environment and (b) production water from a production flow extracted in an underground formation containing hydrocarbons.

3. The method according to claim 2, comprising at least one of:
   (a) pre-treating the production water prior to the filtration of the latter, the pre-treatment comprising at least one step selected from gas/liquid separation, liquid/solid separation and water/hydrocarbons separation; and
   (b) pre-treating the withdrawn water prior to the filtration of the latter, the pre-treatment comprising at least one step selected from preliminary filtration, deoxygenation, chlorination, desulfatation, biocidal treatment and injection of anti-deposition or anti-corrosion compounds.

4. The method according to claim 1, further comprising purification of the treated water flow in an additional membrane filtration unit, and collecting a flow of treated and purified water from the additional membrane filtration unit.

5. The method according to claim 1, further comprising locating the membrane filtration unit at sea on one of: (a) a floating support or (b) a sea bed.

6. The method according to claim 1, further comprising injecting the flow of treated and if necessary purified water into an underground formation containing hydrocarbons.

7. The method according to claim 6; further comprising, before the step of injecting, adding at least one additive into the flow of treated and if necessary purified water.

8. The method according to claim 1, wherein the membrane filtration unit comprises more than one membrane filtration module, and wherein the membrane filtration modules are positioned in series.

9. The method according to claim 1, wherein the membrane filtration unit comprises more than one membrane filtration module, and wherein the membrane filtration modules are positioned in parallel.

10. A method for producing hydrocarbons comprising:
    (i) filtering water with at least one membrane filtration module including an inlet and an outlet, the water containing hydrocarbons in an amount of up to 1000 ppm and suspended solid materials in an amount of up to 200 mg/L;
    (ii) collecting a permeate and collecting a retentate at the outlet of the at least one membrane filtration module;
    (iii) withdrawing at least one of: (a) solid material and (b) hydrocarbons, contained in the retentate collected after step (ii) in order to provide a treated retentate;
    (iv) recycling the treated retentate at the inlet of the at least one membrane filtration module; and
    (v) providing a treated water flow from the permeate of the at least one membrane filtration module, the treated water flow comprising less than 10 ppm of hydrocarbons and less than 10 mg/L of suspended solid materials;
    (vi) injecting the flow of treated and if necessary purified water into an underground formation containing hydrocarbons; and
    (vii) recovering a flow of the hydrocarbons from a production flow.

11. A water treatment installation, comprising:
    (a) a membrane filtration unit comprising:
       at least one membrane filtration module;
       a water admission line connected at the inlet of the membrane filtration module(s);
       a line for collecting permeate connected at the outlet of the membrane filtration module(s);
       a retentate collector connected at the outlet of the membrane filtration module(s);
       a separator operably separating at least one of: liquid/solid or water/hydrocarbons, the separator being fed only by the retentate collector;
       a line for recycling the treated retentate, connected at the outlet of the separator and feeding the water admission line; and
    (b) a line for collecting treated water from the membrane filtration unit,
    wherein the membrane filtration unit includes inorganic membrane filters in ceramic based $Al_2O_3$, $TiO_2$, $ZrO_2$, $SiO_2$, MgO, SiC or a mixture thereof, having a pore size ranging from 0.01 to 10 µm.

12. The installation according to claim 11, wherein the separator further comprises a hydrocyclone.

13. The installation according to claim 11, further comprising:
    a pump for withdrawing water from the environment;
    a unit for extracting hydrocarbons contained in an underground formation;
    a line for admitting withdrawn water stemming from the pump and feeding the membrane filtration unit; and
    a production water admission line fed by the hydrocarbon extraction unit and feeding the membrane filtration unit.

14. The installation according to claim 13, comprising at least one of:
    (a) a first pre-treatment unit located on the production water admission line, the first pre-treatment unit comprising at least one separation system selected from gas/liquid separation systems, liquid/solid separation systems and water/hydrocarbons separation systems; and
    (b) a second pre-treatment unit located on the withdrawn water admission line, the second pre-treatment unit comprising at least one piece of equipment selected from a preliminary filtration system, a deoxygenation system, a chlorination system, a desulfatation system, a biocidal treatment system and a system for injecting anti-deposition or anti-corrosion compounds.

15. The installation according to claim 11, wherein the membrane filtration unit comprises a plurality of membrane filtration trains, each membrane filtration train comprising a feeding pump and at least one circuit which each comprise at least one membrane filtration module, and a distribution system fed by the withdrawn water admission line and the production water admission line and feeding the membrane filtration trains.

16. The installation according to claim 11, comprising:
an additional membrane filtration unit fed by the treated water collecting line; and
a line for collecting treated and purified water connected at the outlet of the additional membrane filtration unit.

17. The installation according to claim 11, wherein the unit is positioned on one of: (a) a floating support at sea or (b) the sea bed.

18. The installation according to claim 11 wherein the membrane filtration unit comprises more than one membrane filtration module, and wherein the membrane filtration modules are positioned in series.

19. The installation according to claim 11, wherein the membrane filtration unit comprises more than one membrane filtration module, and wherein the membrane filtration modules are positioned in parallel.

\* \* \* \* \*